(12) United States Patent
Ye et al.

(10) Patent No.: US 11,629,077 B2
(45) Date of Patent: Apr. 18, 2023

(54) SEWAGE TREATMENT DEVICE CAPABLE OF CONTROLLING PRODUCT CRYSTALLIZATION GRANULARITY AND SEWAGE TREATMENT METHOD

(71) Applicant: INSTITUTE OF URBAN ENVIRONMENT, CHINESE ACADEMY OF SCIENCES, Fujian (CN)

(72) Inventors: Xin Ye, Fujian (CN); Shaohua Chen, Fujian (CN); Minquan Chen, Fujian (CN)

(73) Assignee: INSTITUTE OF URBAN ENVIRONMENT, CHINESE ACADEMY OF SCIENCES, Xiamen (CN)

( * ) Notice: Subject to any disclaimer, the term of this patent is extended or adjusted under 35 U.S.C. 154(b) by 0 days.

(21) Appl. No.: 17/755,310

(22) PCT Filed: Sep. 18, 2021

(86) PCT No.: PCT/CN2021/119217
§ 371 (c)(1),
(2) Date: Apr. 26, 2022

(87) PCT Pub. No.: WO2022/083376
PCT Pub. Date: Apr. 28, 2022

(65) Prior Publication Data
US 2022/0371926 A1    Nov. 24, 2022

(30) Foreign Application Priority Data
Oct. 23, 2020 (CN) .......................... 202011144737.2

(51) Int. Cl.
*C02F 1/52* (2023.01)
*C02F 1/00* (2023.01)
*C02F 103/00* (2006.01)

(52) U.S. Cl.
CPC ...... *C02F 1/5245* (2013.01); *C02F 2001/007* (2013.01); *C02F 2001/5218* (2013.01); *C02F 2103/005* (2013.01); *C02F 2201/005* (2013.01)

(58) Field of Classification Search
CPC .................................................. C02F 1/5245
See application file for complete search history.

(56) References Cited

U.S. PATENT DOCUMENTS

| | | | | |
|---|---|---|---|---|
| 10,266,433 B2* | 4/2019 | Britton | .................. | C02F 1/5236 |
| 2008/0257826 A1* | 10/2008 | Koch | ..................... | B01D 9/005 |
| | | | | 210/709 |

FOREIGN PATENT DOCUMENTS

| | | | |
|---|---|---|---|
| CN | 101941752 A | 1/2011 | |
| CN | 106430506 A | 2/2017 | |

(Continued)

*Primary Examiner* — Peter Keyworth
(74) *Attorney, Agent, or Firm* — Novick, Kim & Lee, PLLC; Allen Xue

(57) ABSTRACT

A sewage treatment device includes a fluidized bed body, a reflux device and a chemical feeding device. The fluidized bed body is sequentially provided with a sedimentation zone, a transition zone and a fluidization zone from top to bottom. The reflux device is connected to the fluidized bed body through a reflux pipe. The reflux pipe extends into the fluidized bed body from the sedimentation zone, and the granularity of a crystal product can be controlled by changing the height of a reflux inlet at the bottom end of the reflux pipe in the fluidized bed body. By controlling the position of the reflux inlet of the reflux pipe in the fluidized bed body, combining product granularity requirements, and adjusting an insertion depth of the reflux pipe, the granularity of a final (Continued)

product can be flexibly regulated and controlled, and meanwhile, a product recovery rate is improved.

6 Claims, 3 Drawing Sheets

(56) References Cited

FOREIGN PATENT DOCUMENTS

| | | | |
|---|---|---|---|
| CN | 107456931 A | 12/2017 | |
| CN | 112266062 A | 1/2021 | |
| CN | 213738939 U | 7/2021 | |
| JP | 2004290862 A | 10/2004 | |
| WO | WO-03084635 A1 * | 10/2003 | ......... B01D 17/0208 |

* cited by examiner

SEWAGE TREATMENT DEVICE CAPABLE OF CONTROLLING PRODUCT CRYSTALLIZATION GRANULARITY AND SEWAGE TREATMENT METHOD

FIELD

The present disclosure belongs to the technical field of sewage treatment and recycling, and in particular relates to a sewage treatment device capable of controlling product crystallization granularity and a sewage treatment method.

BACKGROUND

Fluidized bed crystallization is a common technology for wastewater treatment and recycling. Compared with the traditional stirring reactor, a fluidized bed can realize continuous treatment of wastewater and intermittent discharge of crystal products. It is good in pollutant removal, and high in shock resistance. The obtained product is low in water content, large in granularity and low in impurity content. Meanwhile, the system is easy to automatically control and is widely concerned in the fields of pollutant removal and recovery (such as phosphorus recovery and fluorine removal), drinking water softening (calcium removal) and the like.

However, the existing fluidized bed crystallization technology generally has problems of low crystal product recovery rate, entrainment of microcrystals in effluent and the like. In order to prevent the microcrystals affecting the effluent quality and subsequent treatment facilities, a sedimentation tank or a solid-liquid separator is usually additionally adopted after the fluidized bed to improve the interception of the microcrystals. In Chinese invention patent CN103935974B, a method for recovering high-concentration ammonia nitrogen in sewage into high-purity large-particle struvite is disclosed, and a secondary sedimentation tank is additionally used after a three-stage conical fluidized bed. In a struvite production device disclosed in Chinese utility model patent CN201809171U, a sedimentation tank is also adopted to intercept microcrystals entrained in effluent of a fluidized bed. The application of sedimentation facility inevitably prolongs the treatment process and increases the occupied area, and meanwhile, the microcrystals intercepted by the sedimentation facility need to be additionally collected and treated, so that the operation and maintenance costs of the treatment system will be increased.

In addition, researchers also try to perform functional partitioning in a crystallization reactor through additionally disposed internal components, and directly intercept the microcrystals in the system by means of internal circulation. For example, a device for removing phosphate in wastewater by a struvite particle crystallization method disclosed in Chinese invention patent CN104529027B adopts a multi-cylinder nesting design, and an impeller is placed in the device to provide a driving force for internal circulation. Similarly, Chinese invention patent CN104129769B provides a compact struvite recovery device with high efficiency and low consumption, which is also additionally provided with internal components to realize functional partitioning, and allows crystal mixed liquid to flow back to the bottom of the device to realize internal circulation. Although internal circulation avoids microcrystal loss and saves subsequent sedimentation, existing internal circulation equipment cannot achieve granulation of a crystal product, and meanwhile is complex in design and large in operation management difficulty.

In conclusion, the above two conventional methods cannot simply, efficiently and synchronously realize the recovery of the crystal product and the manual control of the product granularity.

SUMMARY

The present disclosure aims to solve the technical problem of incapability of synchronously realizing efficient interception and granulation of crystals in the existing fluidized bed crystallization technology. Based on the principles of crystallization kinetics and fluid mechanics, the present disclosure provides a simple sewage treatment device which can synchronously improve the recovery rate of a crystal product and control the product granularity, and a sewage treatment method.

In a first aspect, the present disclosure provides a sewage treatment device capable of controlling product crystallization granularity. The sewage treatment device includes a fluidized bed body, a reflux device and a chemical feeding device. The fluidized bed body is sequentially provided with a sedimentation zone, a transition zone and a fluidization zone from top to bottom. The reflux device is connected to the fluidized bed body through a reflux pipe. The reflux pipe extends into the fluidized bed body from the sedimentation zone, and the granularity of a crystal product can be controlled by changing the height of a reflux inlet at the bottom end of the reflux pipe in the fluidized bed body.

The fluidized bed body is sequentially provided with the sedimentation zone, the transition zone and the fluidization zone from top to bottom. The top end of the fluidization zone is connected to the transition zone. The top end of the transition zone is connected to the sedimentation zone. An overflow weir is installed at the top of the sedimentation zone.

A discharge port and at least one feed port are formed at the bottom of the fluidization zone, and the at least one feed port is positioned above the discharge port. Sewage enters the fluidized bed body from the bottom of the fluidized bed body and is discharged from the overflow weir at the top after crystallization treatment, and inorganic particles formed by crystallization are discharged from the discharge port.

Preferably, the fluidization zone is provided with a plurality of feed ports which are uniformly distributed around the circumference of the bottom of the fluidization zone.

The ratio of a pipe diameter of the sedimentation zone to a pipe diameter of the fluidization zone is (3-5):1. The ratio of the sedimentation zone height to the transition zone height to the fluidization zone height is 1:(0.8-2):(1-4). The transition zone is connected between the sedimentation zone and the fluidization zone, and an axial cross section of the transition zone is in the shape of a big-end-up trapezoid.

The reflux device includes a reflux inlet, a retractable reflux pipe and a reflux pump. One end of the reflux pipe is connected to the bottom end of the fluidization zone, and the other end of the reflux pipe is provided with the reflux inlet and is inserted into the fluidized bed body from the top of the sedimentation zone. The reflux pump is connected in the reflux pipe, and used for providing power for allowing feed liquid in the fluidization zone to flow back to the sedimentation zone or the transition zone.

The position of the reflux inlet in the fluidized bed body can be adjusted by the retractable reflux pipe. Preferably, the position change range of the reflux inlet is between an overflow liquid level at the top of the sedimentation zone and the bottom of the transition zone. More preferably, the position change range of the reflux inlet is from 1/20-1/5 below the overflow liquid level at the top of the sedimentation zone to the middle of the transition zone.

The reflux inlet is in the shape of a bell mouth, an included angle between a bottom end opening and a horizontal plane is 30-45 degrees, and a radius of the opening is 1/4-1/2 of a radius of the sedimentation zone.

A length adjusting mode of the retractable reflux pipe is selected from hard connection or flexible connection. Preferably, the hard connection is movable connection of PVC pipes, and the flexible connection is movable connection of metal hoses or PVC corrugated pipes. Of course, other movable connection modes can also be selected, and the present disclosure is not limited to this.

Preferably, the reflux pipe is provided with a pipeline filter to filter out small crystals entering the reflux pipe, so that the granulation rate of the product can be accelerated, and the granularity of the final product can be improved.

The reflux pump is a diaphragm pump or an impeller centrifugal pump. Preferably, the reflux pump is the diaphragm pump which can reduce the crushing effect of hydraulic shearing on microcrystal aggregates entering the reflux pipe, accelerate the granulation rate of the product, and thus improve the granularity of the final product.

The chemical feeding device includes a chemical storage box, a chemical feeding pump and a chemical feeding pipe. One end of the chemical feeding pipe is connected to the chemical storage box, and the other end of the chemical feeding pipe is divided into two paths. A first path is inserted into the fluidized bed body from one side of the sedimentation zone through the chemical feeding pump. A top chemical feeding port is formed at the end, inserted into the fluidized bed body, of the first path of the chemical feeding pipe, and a second path of the chemical feeding pipe is connected to the lower middle part of the sidewall of the fluidization zone and is provided with a plurality of bottom chemical feeding ports. By changing the position of the top chemical feeding port in the fluidized bed body, the reflux pipe is assisted to control the granularity of the crystal product.

Preferably, the top chemical feeding port includes a main pipe and a plurality of branch pipes. The plurality of the branch pipes are disposed at different heights of the main pipe. Each branch pipe is provided with a control valve, the control valves are used for controlling the branch pipes at the different heights to perform chemical feeding, and each control valve can adjust the chemical feeding amount of the corresponding branch pipe in real time. Therefore, the purpose of adjusting the chemical feeding height can be achieved by controlling the chemical feeding of the different branch pipes without changing the overall height of the chemical feeding port.

In a second aspect, the present disclosure provides a sewage treatment method. By using the above-mentioned sewage treatment device, the method can simultaneously improve the recovery rate of the crystal product and control the product granularity. The method includes the following steps:

(1) placing the reflux inlet in the middle of the transition zone by adjusting an insertion depth of the reflux pipe in the fluidized bed body, and disposing the top chemical feeding port in the sedimentation zone by adjusting an insertion depth of the chemical feeding pipe in the fluidized bed body;

(2) inputting sewage into the fluidized bed body from the feed ports, starting the reflux pump and the chemical feeding pump, and feeding chemicals through the bottom chemical feeding ports to prepare microcrystals;

(3) after reacting for a period of time, placing the reflux inlet at a proper position in the fluidized bed body by adjusting the insertion depth of the reflux pipe; and enabling the top chemical feeding port, and adjusting the chemical feeding amounts of the different branch pipes of the top feeding port; and (4) opening the discharge port to obtain a granular crystal product.

The sewage in the step (2) is used as a raw material. The inorganic matter concentration range of a target crystal substance is 50-2000 mg/L. The pollutant concentration range is wide. Therefore, the sewage treatment method is suitable for various sewage treatment systems.

Preferably, in the step (3), by adjusting the insertion depth of the reflux pipe, the reflux inlet is lifted to a position that is 1/20-1/5 below the overflow liquid level at the top of the sedimentation zone.

Preferably, in the step (3), through enabling the branch pipes at different heights, the top chemical feeding port is located within the range of the sedimentation zone and the transition zone.

More preferably, for different pollutants in the sewage, by adjusting the chemical feeding amounts of the branch pipes at different heights, the chemical feeding condition is flexibly controlled, and the crystal products with different granularities can be prepared in cooperation with the different insertion depths and reflux ratios of the reflux pipe.

The sewage treatment device and the sewage treatment method provided by the present disclosure are suitable for various crystallization systems, such as struvite crystallization, calcium fluoride crystallization, calcium carbonate crystallization and calcium phosphate crystallization systems.

Compared with the prior art, the present disclosure has the following technical advantages:

(1) space-time regulation and control of the granularity of the crystal product are realized by adjusting the height of the reflux inlet: in terms of time, a seed crystal is firstly prepared, and then granulation is completed. In terms of space, nucleation is realized at the bottom of the fluidized bed, and crystal growth and coalescence are realized at the upper middle part of the fluidized bed. Optionally, crushing is realized in the reflux pipe;

(2) the fluidized bed body can realize full-amount product interception, and a sedimentation tank does not need to be additionally disposed in the follow-up process;

(3) for a built crystallization fluidized bed, the reflux device provided by the present disclosure can be additionally disposed in the existing fluidized bed, with no need to change the structure of the original fluidized bed, and thus the transformation cost is low; and (4) the whole device is simple in structure and low in maintenance and operation difficulty.

In the figures, 1—fluidization zone; 2—transition zone; 3—sedimentation zone; 4—overflow weir; 5—reflux pipe; 6—reflux inlet; 7—reflux pump; 8—true union ball valve; 9—discharge port; 10—feed port; 11—chemical feeding pipe; 1101—bottom chemical feeding port; 1102—top chemical feeding port; 1103—main pipe; 1104—branch pipe; 12—chemical feeding pump; and 13—chemical storage box.

DETAILED DESCRIPTION OF THE EMBODIMENTS

Embodiment 1

Figure 1:
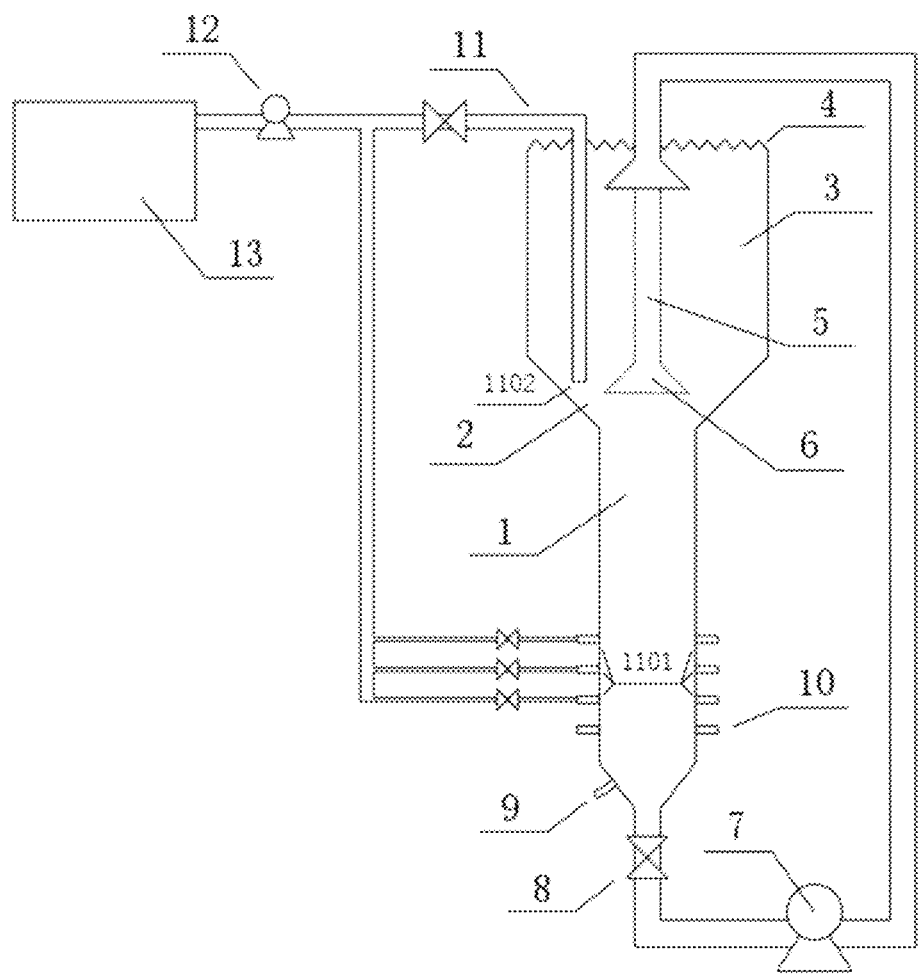
FIG. 1 is a structural schematic diagram of a sewage treatment device provided by the embodiments of the present disclosure.

This embodiment provides a sewage treatment device capable of controlling product crystallization granularity. As shown in FIG. 1, the sewage treatment device includes a fluidized bed body, a reflux device and a chemical feeding device. The fluidized bed body is sequentially provided with a sedimentation zone 3, a transition zone 2 and a fluidization zone 1 from top to bottom. The reflux device is connected to the fluidized bed body through a reflux pipe 5. The reflux pipe 5 extends into the fluidized bed body from the sedimentation zone 3, and the granularity of a crystal product can be controlled by changing the height of a reflux inlet 6 at the bottom end of the reflux pipe in the fluidized bed body.

By improving the reflux device, and making full use of the growth law of crystals and the flowing characteristics of fluid in the fluidized bed body, the height-variable reflux pipe 5 is inventively provided, namely, the granularity of the crystal product in sewage is adjusted by changing the height position of the reflux inlet 6 at the bottom end of the reflux pipe in the fluidized bed. Crystal nucleation mainly occurs at the bottom of the fluidized bed, and crystal growth and coalescence mainly occur at the upper part of the fluidized bed. Reflux liquid carries part of microcrystals to flow back to the sedimentation zone or transition zone of the fluidized bed, and is mixed and interacts with the growing and coalescing crystals to change the granularity of a final product.

The top end of the fluidization zone 1 is connected to the transition zone 2. The top end of the transition zone 2 is connected to the sedimentation zone 3. An overflow weir 4 is disposed at the top of the sedimentation zone.

A discharge port 9 and four feed ports 10 are formed at the bottom of the fluidization zone, and the feed ports are positioned above the discharge port. The sewage enters the fluidized bed body from the bottom of the fluidized bed body and is discharged from the overflow weir 4 at the top after crystallization treatment, and inorganic particles formed by crystallization are discharged from the discharge port 9.

A ratio of a pipe diameter of the sedimentation zone to a pipe diameter of the fluidization zone is 3:1. A ratio of the sedimentation zone height to the transition zone height to the fluidization zone height is 1:0.8:1. The transition zone is connected between the sedimentation zone and the fluidization zone, and an axial cross section of the transition zone is in the shape of a big-end-up trapezoid. Specifically, the processing load of the fluidized bed is designed to be 12 m$^3$/d. The pipe diameter of the fluidization zone is 0.6 m, and the height of the fluidization zone is 1.2 m. The height of the transition zone is 0.96 m. The pipe diameter of the sedimentation zone is 1.8 m and the height of the sedimentation zone is 1.2 m.

The reflux device includes the reflux inlet 6, a retractable reflux pipe 5 and a reflux pump 7. One end of the reflux pipe is connected to the bottom end of the fluidization zone 1, and the other end of the reflux pipe is provided with the reflux inlet 6 and is inserted into the fluidized bed body from the top of the sedimentation zone 3. The reflux pump is connected in the reflux pipe and is used for providing power for allowing feed liquid in the fluidization zone to flow back to the sedimentation zone or the transition zone. A true union ball valve 8 is disposed at the front part of the reflux pipe 5.

The position of the reflux inlet in the fluidized bed body can be adjusted by the retractable reflux pipe 5. Preferably, the position change range of the reflux inlet is between an overflow liquid level at the top of the sedimentation zone and the bottom of the transition zone.

The reflux inlet 6 is in the shape of a bell mouth, an included angle between a bottom end opening and a horizontal plane is 45 degrees, and a radius of the opening is ¼ of a radius of the sedimentation zone.

A length adjusting mode of the retractable reflux pipe is movable connection of PVC pipes.

The reflux pipe is provided with a pipeline filter to filter out small crystals entering the reflux pipe, so that the granulation rate of the product can be accelerated, and the granularity of the final product can be improved.

The reflux pump is a diaphragm pump, which can reduce the crushing effect of hydraulic shearing on microcrystal aggregates entering the reflux pipe, accelerate the granulation rate of the product, and thus improve the granularity of the final product.

The inventors have found that a feed zone of the fluidization zone 1 has an extremely high concentration, so that nucleation inevitably occurs to form microcrystals, and this phenomenon is particularly prominent in the treatment of high concentration wastewater. With the progress of a crystallization reaction, supersaturation in the fluidized bed decreases with the increase of the axial height. The lower supersaturation is helpful for crystal growth and coalescence. Crystal nucleation mainly occurs at the bottom of the fluidized bed, and crystal growth and coalescence mainly occur at the upper part of the fluidized bed. According to the above-mentioned crystal nucleation, growth and coalescence phenomena, by combining product granularity requirements, and adjusting the insertion depth of the reflux pipe 5, the granularity of the final product can be flexibly regulated and controlled, and meanwhile, the product recovery rate is improved.

A chemical feeding system includes a chemical storage box 13, a chemical feeding pump 12 and a chemical feeding pipe 11. One end of the chemical feeding pipe 11 is connected to The chemical storage box 13, and the other end of the chemical feeding pipe 11 is divided into two paths. A first path is inserted into the fluidized bed body from one side of the sedimentation zone 3 through the chemical feeding pump 12. A top chemical feeding port 1102 is formed at the end, inserted into the fluidized bed body, of the first path of the chemical feeding pipe, and a second path of the chemical feeding pipe is connected to the lower middle part of the sidewall of the fluidization zone 1 and is provided with six bottom chemical feeding ports 1101. By changing the position of the top chemical feeding port in the fluidized bed body, the reflux pipe is assisted to control the granularity of the crystal product.

The inventors have found that by controlling the chemical feeding position of the chemical feeding pipe in the fluidized bed body, the crystallization conditions in different zones of the fluidized bed body can be changed, and the granularity of the crystal product can be controlled in cooperation with the height of the reflux inlet in the fluidized bed body.

Embodiment 2

Figure 2:
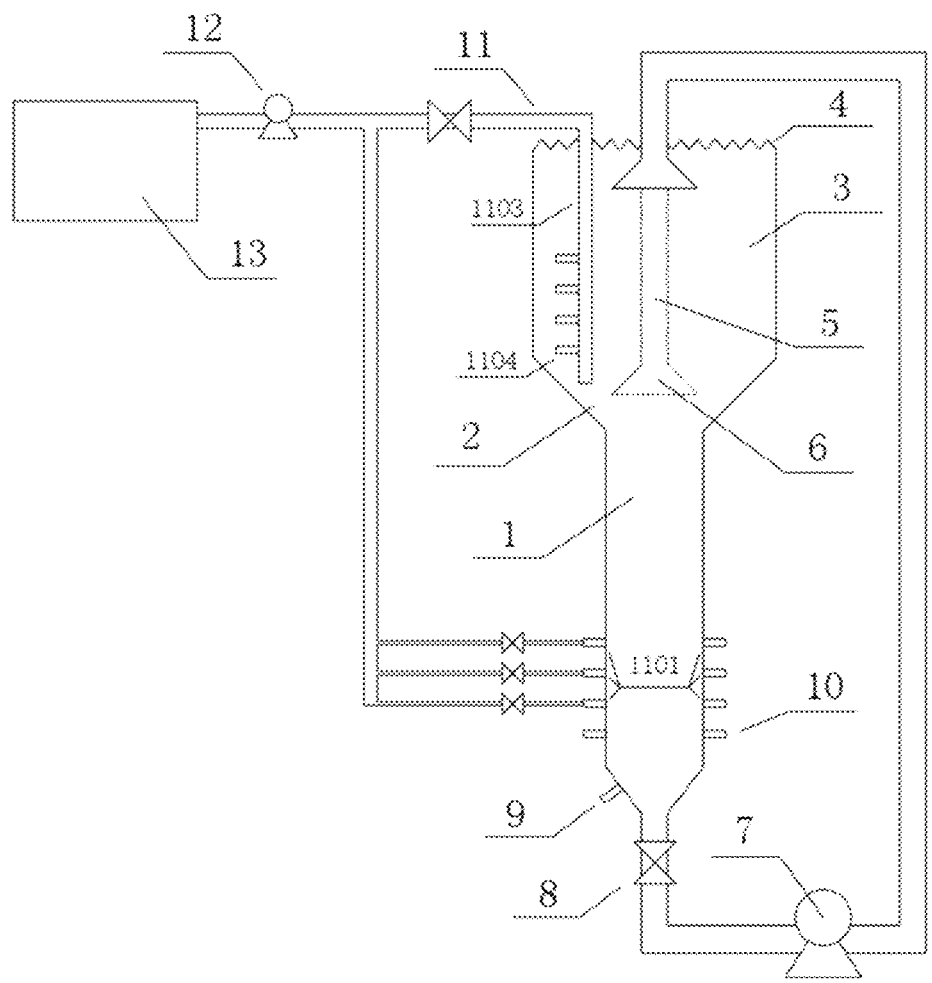
FIG. 2 is a structural schematic diagram of another sewage treatment device provided by the embodiments of the present disclosure.

This embodiment provides a sewage treatment device capable of controlling product crystallization granularity. As shown in FIG. 2, a ratio of a pipe diameter of a sedimentation zone to a pipe diameter of a fluidization zone is 5:1. A ratio of a height of the sedimentation zone to a height of a transition zone to a height of the fluidization zone is 1:2:4. Specifically, the processing load of a fluidized bed is designed to be 50 m³/d. The pipe diameter of the fluidization zone is 0.6 m, and the height of the fluidization zone is 4.0 m. The height of the transition zone is 2.0 m. The pipe diameter of the sedimentation zone is 3 m, and the height of the sedimentation zone is 1.0 m.

A reflux pump is an impeller centrifugal pump. The position of a reflux inlet in a fluidized bed body can be adjusted by a retractable reflux pipe 5. The position change range of the reflux inlet is from 1/20-1/5 below an overflow liquid level at the top of the sedimentation zone to the middle of the transition zone.

The reflux inlet 6 is in the shape of a bell mouth, an included angle between a bottom end opening and a horizontal plane is 30 degrees, and a radius of the opening is 1/2 of a radius of the sedimentation zone.

A top chemical feeding port in chemical feeding ports includes a main pipe 1103 and four branch pipes 1104. The four branch pipes are disposed at different heights of the main pipe. Each branch pipe 1103 is provided with a control valve, the control valves are used for controlling the branch pipes at the different heights to perform chemical feeding, and each control valve can adjust the chemical feeding amount of the corresponding branch pipe in real time. Therefore, the purpose of adjusting the chemical feeding height can be realized by controlling the chemical feeding of the different branch pipes without changing the overall height of the top chemical feeding port.

The other structures of the sewage treatment device provided by this embodiment are the same as those in Embodiment 1.

Embodiment 3

This embodiment provides a sewage treatment method using the sewage treatment device in Embodiment 1. The method includes the following steps:

(1) placing the reflux inlet in the middle of the transition zone by adjusting an insertion depth of the reflux pipe in the fluidized bed body, and disposing the top chemical feeding port in the sedimentation zone by adjusting an insertion depth of the first path of the chemical feeding pipe in the fluidized bed body;

(2) inputting wooden activated carbon production wastewater into the fluidized bed body from the feed ports for treatment, the phosphate concentration in the wastewater being 1500 mg/L, starting the reflux pump and the chemical feeding pump, and performing chemical feeding through the bottom chemical feeding ports to prepare microcrystals, wherein operating parameters are as follows: pH is 8.5, an ascending flow rate in the fluidization zone is 0.02 m/s, and a flow rate in the sedimentation zone is 0.002 m/s; and a nitrogen source and a magnesium source are fed through the bottom chemical feeding ports, wherein ammonium chloride or ammonia water is used as the nitrogen source, magnesium chloride, magnesium sulfate or brine is used as the magnesium source, N/P is controlled to be 1.0, Mg/P is controlled to be 1.5, and a reflux ratio is controlled to be 30;

(3) after reacting for 4 hours, adjusting the insertion depths of the reflux pipe and the chemical feeding pipe, lifting the reflux inlet to a position which is 1/20 below the top overflow liquid level, closing the bottom chemical feeding ports, enabling the top chemical feeding port, and adjusting the top chemical feeding port to be placed in the transition zone, wherein a struvite product is completely intercepted during operation; and (4) setting a discharge cycle to be 4 days, and opening the discharge port to obtain the struvite product.

Figure 3:
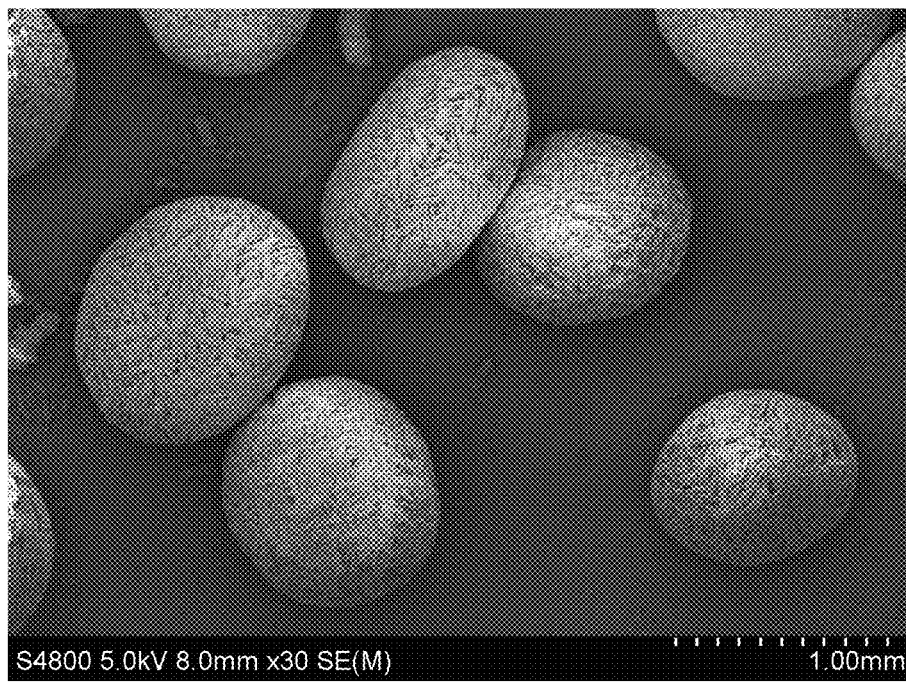
FIG. 3 is an electron micrograph of a struvite powder product when the present disclosure is applied to phosphorus recovery.

As shown in FIG. 3, struvite obtained by the method is uniform in granularity, and the mass percentage of particles with a particle size of 1.0-1.5 mm is as high as 95%.

Embodiment 4

This embodiment provides a sewage treatment method using the sewage treatment device in Embodiment 2. The method includes the following steps:

(1) placing the reflux inlet in the middle of the transition zone by adjusting an insertion depth of the reflux pipe in the fluidized bed body, and disposing the top chemical feeding port in the sedimentation zone by adjusting an insertion depth of the first path of the chemical feeding pipe in the fluidized bed body;

(2) inputting livestock and poultry breeding wastewater into the fluidized bed body from the feed ports for treatment, the phosphate concentration in the wastewater being 100 mg/L, starting the reflux pump and the chemical feeding pump, and performing chemical feeding through the bottom chemical feeding ports to prepare microcrystals, wherein operating parameters are as follows: pH is 8.5, an ascending flow rate in the fluidization zone is 0.04 m/s, and a flow rate in the sedimentation zone is 0.002 m/s; and a nitrogen source and a magnesium source are fed through the bottom chemical feeding ports, wherein ammonium chloride or ammonia water is used as the nitrogen source, magnesium chloride, magnesium sulfate or brine is used as the magnesium source, N/P is controlled to be 1.0, Mg/P is controlled to be 1.5, and a reflux ratio is controlled to be 20;

(3) after reacting for 24 hours, adjusting the insertion depths of the reflux pipe and the chemical feeding pipe, lifting the reflux inlet to a position which is 1/5 below the top overflow liquid level, closing the bottom chemical feeding ports, enabling the top chemical feeding port, placing the two branch pipes at the upper part of the top chemical feeding port in the transition zone and keeping the chemical feeding amounts thereof invariable, and closing the two branch pipes at the lower part, wherein a struvite product is completely intercepted during operation; and (4) setting a discharge cycle to be 10 days, and opening the discharge port to obtain the struvite product.

Figure 4:
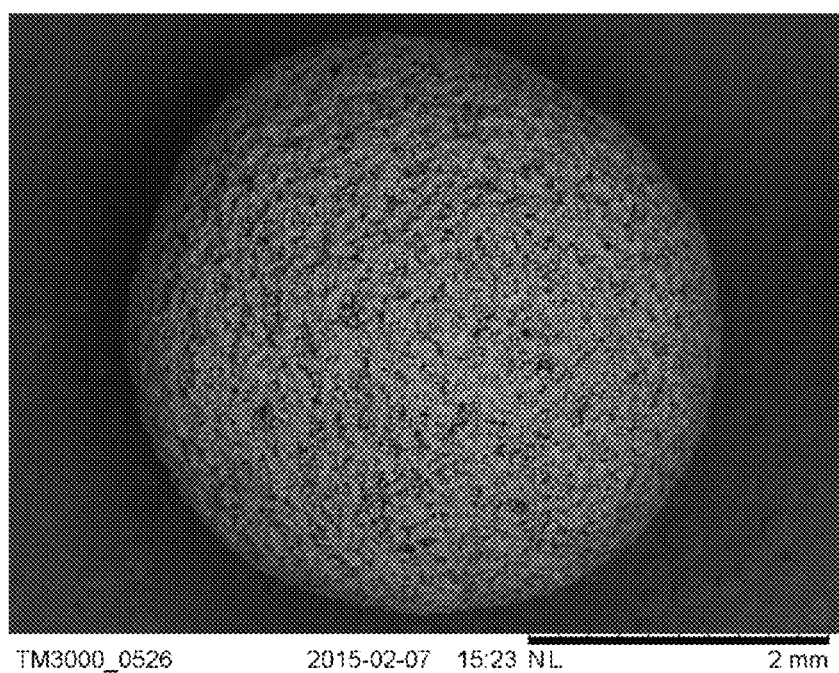
FIG. 4 is an electron micrograph of a struvite particle product when the present disclosure is applied to phosphorus recovery.

As shown in FIG. 4, the struvite obtained by the method is uniform in granularity, and the mass percentage of particles with a particle size of 2.8-3.2 mm is as high as 85%.

Embodiment 5

This embodiment provides a sewage treatment method using the sewage treatment device in Embodiment 1. The method includes the following steps:

(1) placing the reflux inlet in the middle of the transition zone by adjusting an insertion depth of the reflux pipe in the fluidized bed body, and disposing the top chemical feeding port in the sedimentation zone by adjusting an insertion depth of the first path of the chemical feeding pipe in the fluidized bed body;

(2) inputting fluoride wastewater into the fluidized bed body from the feed ports for treatment, the phosphate concentration in the wastewater being 1000 mg/L, starting the reflux pump and the chemical feeding pump, and performing chemical feeding through the bottom chemical feeding ports to prepare microcrystals, wherein operating parameters are as follows: pH is 9.0, an ascending flow rate in the fluidization zone is 0.02 m/s, and a flow rate in the sedimentation zone is 0.002 m/s; and calcium chloride is fed through the bottom chemical feeding ports, wherein Ca/F is controlled to be 0.8, and a reflux ratio is controlled to be 20;

(3) after reacting for 6 hours, adjusting the insertion depths of the reflux pipe and the chemical feeding pipe, lifting the reflux inlet to a position which is 1/20 below the top overflow liquid level, closing the bottom chemical feeding ports, enabling the top chemical feeding port, and adjusting the top chemical feeding port to be placed in the transition zone, wherein a calcium fluoride product is completely intercepted during operation; and (4) setting a discharge cycle to be 4 days, and opening the discharge port to obtain the calcium fluoride product, wherein the mass percentage of particles with a particle size of 1.0-1.5 mm is as high as 83%.

Embodiment 6

This embodiment provides a sewage treatment method using the sewage treatment device in Embodiment 2. The method includes the following steps:

(1) placing the reflux inlet in the middle of the transition zone by adjusting an insertion depth of the reflux pipe in the fluidized bed body, and disposing four branch pipes of the top chemical feeding port in the sedimentation zone by adjusting an insertion depth of the first path of the chemical feeding pipe in the fluidized bed body;

(2) inputting wooden activated carbon production wastewater into the fluidized bed body from the feed ports for treatment, the phosphate concentration in the wastewater being 2000 mg/L, starting the reflux pump and the chemical feeding pump, and performing chemical feeding through the bottom chemical feeding ports to prepare microcrystals, wherein operating parameters are as follows: pH is 9.5, an ascending flow rate in the fluidization zone is 0.01 m/s, and a flow rate in the sedimentation zone is 0.002 m/s; and a lime suspension or a calcium chloride solution is fed through the bottom chemical feeding ports, wherein Ca/P is controlled to be 3.0, and a reflux ratio is controlled to be 20;

(3) after reacting for 2 hours, adjusting the insertion depths of the reflux pipe and the chemical feeding pipe, lifting the reflux inlet to a position which is 1/5 below the top overflow liquid level, closing the bottom chemical feeding ports, enabling the top chemical feeding port, uniformly disposing four branch pipes of the top chemical feeding port in the height range of the sedimentation zone, wherein the chemical feeding amounts of the four branch pipes are the same, and a calcium phosphate product is completely intercepted during operation; and (4) setting a discharge cycle to be 10 days, and opening the discharge port to obtain the calcium phosphate product, wherein the mass percentage of particles with a particle size of 0.8-1.2 mm is as high as 80%.

What is claimed is:

1. A sewage treatment device capable of controlling product crystallization granularity, comprising a fluidized bed body, a reflux device and a chemical feeding device, wherein the fluidized bed body is sequentially provided with a sedimentation zone, a transition zone and a fluidization zone from top to bottom, the reflux device is connected to the fluidized bed body through a reflux pipe, the reflux pipe extends into the fluidized bed body from the sedimentation zone, and the granularity of a crystal product can be controlled by changing the height of a reflux inlet at the bottom end of the reflux pipe in the fluidized bed body.

2. The sewage treatment device according to claim 1, wherein the top end of the fluidization zone is connected to the transition zone, the top end of the transition zone is connected to the sedimentation zone, and an overflow weir is installed at the top of the sedimentation zone; and a discharge port and at least one feed port are formed at the bottom of the fluidization zone, and the at least one feed port is positioned above the discharge port.

3. The sewage treatment device according to claim 2, wherein the ratio of a pipe diameter of the sedimentation zone to a pipe diameter of the fluidization zone is (3-5):1, and the ratio of the sedimentation zone height to the transition zone height to the fluidization zone height is 1:(0.8-2):(1-4); and the transition zone is connected between the sedimentation zone and the fluidization zone, and an axial cross section of the transition zone is in the shape of a big-end-up trapezoid.

4. The sewage treatment device according to claim 3, wherein the reflux device comprises the reflux inlet, a retractable reflux pipe and a reflux pump, wherein one end of the reflux pipe is connected to the bottom end of the fluidization zone, the other end of the reflux pipe is provided with the reflux inlet and is inserted into the fluidized bed body from the top of the sedimentation zone, and the reflux pump is connected in the reflux pipe.

5. The sewage treatment device according to claim 1, wherein the chemical feeding device comprises a chemical storage box, a chemical feeding pump and a chemical feeding pipe, wherein one end of the chemical feeding pipe is connected to the chemical storage box, the other end of the chemical feeding pipe is divided into two paths, the first path is inserted into the fluidized bed body from one side of the sedimentation zone through the chemical feeding pump, a top chemical feeding port is formed at the end, inserted into the fluidized bed body, of the first path of the chemical feeding pipe, and a second path of the chemical feeding pipe is connected to the lower middle part of the sidewall of the fluidization zone and is provided with a plurality of bottom chemical feeding ports.

6. The sewage treatment device according to claim 5, wherein the top chemical feeding port comprises a main pipe and a plurality of branch pipes, the plurality of branch pipes are disposed at different heights of the main pipe, each branch pipe is provided with a control valve, the control valves are used for controlling the branch pipes at the different heights to perform chemical feeding, and each control valve can adjust the chemical feeding amount of the corresponding branch pipe in real time.

* * * * *